(12) United States Patent
Jain

(10) Patent No.: US 12,529,767 B2
(45) Date of Patent: Jan. 20, 2026

(54) LiDAR WITH METASURFACE BEAM STEERING

(71) Applicant: Luminar Technologies, Inc., Orlando, FL (US)

(72) Inventor: Aditya Jain, Minneapolis, MN (US)

(73) Assignee: Luminar Technologies, Inc., Orlando, FL (US)

( * ) Notice: Subject to any disclaimer, the term of this patent is extended or adjusted under 35 U.S.C. 154(b) by 878 days.

(21) Appl. No.: 17/850,523

(22) Filed: Jun. 27, 2022

(65) Prior Publication Data

US 2022/0413103 A1 Dec. 29, 2022

Related U.S. Application Data

(60) Provisional application No. 63/215,790, filed on Jun. 28, 2021.

(51) Int. Cl.
*G01S 7/481* (2006.01)
*G02B 26/08* (2006.01)

(52) U.S. Cl.
CPC ........ *G01S 7/4817* (2013.01); *G02B 26/0825* (2013.01)

(58) Field of Classification Search
CPC . G01S 7/4817; G02B 26/0825; G02B 26/101; G02B 26/10; G02B 26/08; G02B 26/0816; G02B 26/0808; G02B 26/103; G02B 26/0875; G02B 26/106
See application file for complete search history.

(56) References Cited

U.S. PATENT DOCUMENTS

| | | | |
|---|---|---|---|
| 6,934,444 B2 | 8/2005 | Ghiron et al. | |
| 9,104,086 B1 | 8/2015 | Davids et al. | |
| 10,234,743 B2 * | 3/2019 | Kim | G02F 1/0018 |
| 10,503,043 B2 | 12/2019 | Kim et al. | |
| 10,831,082 B2 | 11/2020 | Shorokhov et al. | |
| 2015/0268461 A1 * | 9/2015 | Murarka | B81C 1/00158 |
| | | | 359/224.1 |

\* cited by examiner

*Primary Examiner* — Alexander P Gross
(74) *Attorney, Agent, or Firm* — Van Pelt, Yi & James LLP

(57) ABSTRACT

A light detection and ranging system can have a metasurface that continuously extends between a pair of electrical contacts. The metasurface may be separated from an underlying silicon substrate by an air gap with the silicon substate doped with a P-i-N configuration to create electrostatic force that alters a size of the air gap in response to a voltage bias between the pair of electrical contacts.

19 Claims, 3 Drawing Sheets

LiDAR WITH METASURFACE BEAM STEERING

RELATED APPLICATIONS

The present application makes a claim of domestic priority under 35 U.S.C. 119(e) to U.S. Provisional Patent Application No. 63/215,790 filed Jun. 28, 2021, the contents of which being hereby incorporated by reference.

SUMMARY

Light detection and ranging can be optimized, in various embodiments, by providing a metasurface that continuously extends between a pair of electrical contacts. The metasurface may be separated from an underlying silicon substrate by an air gap with the silicon substrate doped with a P-i-N configuration to create electrostatic force that alters a size of the air gap in response to a voltage bias between the pair of electrical contacts.

DETAILED DESCRIPTION

Various embodiments of the present disclosure are generally directed to optimization of an active light detection system.

Advancements in computing capabilities have corresponded with smaller physical form factors that allow intelligent systems to be implemented into a diverse variety of environments. Such intelligent systems can complement, or replace, manual operation, such as with the driving of a vehicle or flying a drone. The detection and ranging of stationary and/or moving objects with radio or sound waves can provide relatively accurate identification of size, shape, and distance. However, the use of radio waves (300 GHz-3 kHz) and/or sound waves (20 kHZ-200 kHz) can be significantly slower than light waves (430-750 Terahertz), which can limit the capability of object detection and ranging while moving.

The advent of light detection and ranging (LiDAR) systems employ light waves that propagate at the speed of light to identify the size, shape, location, and movement of objects with the aid of intelligent computing systems. The ability to utilize multiple light frequencies and/or beams concurrently allows LiDAR systems to provide robust volumes of information about objects in a multitude of environmental conditions, such as rain, snow, wind, and darkness. Yet, current LiDAR systems can suffer from inefficiencies and inaccuracies during operation that jeopardize object identification as well as the execution of actions in response to gathered object information. Hence, embodiments are directed to structural and functional optimization of light detection and ranging systems to provide increased reliability, accuracy, safety, and efficiency for object information gathering.

Figure 1:
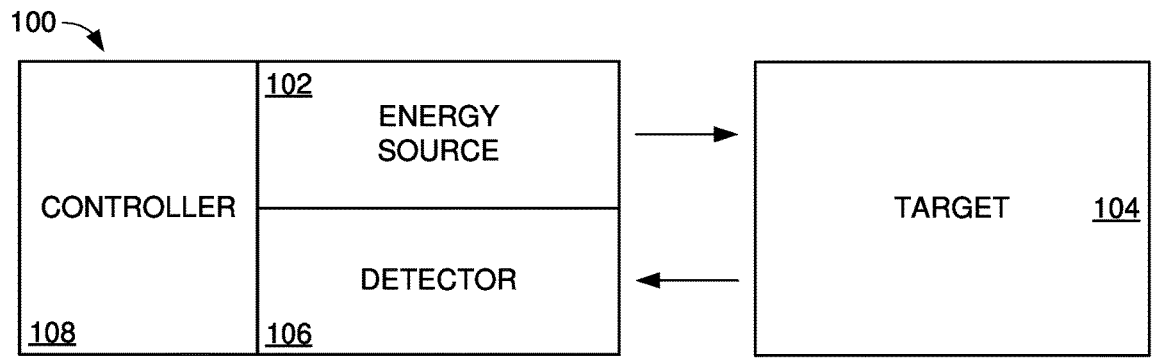
FIG. 1 is a block representation of an example environment in which assorted embodiments can be practiced.

FIG. 1 depicts a block representation of portions of an example object detection environment 100 in which assorted embodiments can be practiced. One or more energy sources 102, such as a laser or other optical emitter, can produce photons that travel at the speed of light towards at least one target 104 object. The photons bounce off the target 104 and are received by one or more detectors 106. An intelligent controller 108, such as a microprocessor or other programmable circuitry, can translate the detection of returned photons into information about the target 104, such as size and shape.

Figure 2:
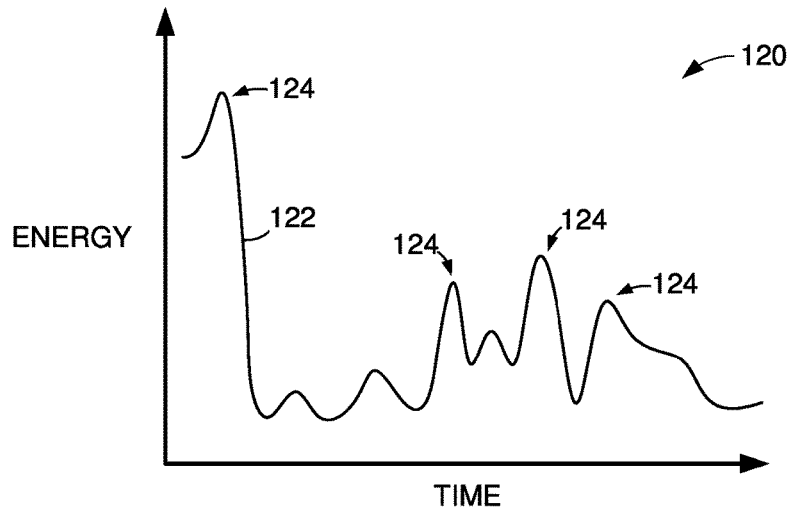
FIG. 2 plots operational information for an example detection system configured in accordance with some embodiments.

The use of one or more energy sources 102 can emit photons over time that allow the controller 108 to track an object and identify the target's distance, speed, velocity, and direction. FIG. 2 plots operational information for an example light detection and ranging system 120 that can be utilized in the environment 100 of FIG. 1. Solid line 122 conveys the volume of photons received by a detector over time. The greater the intensity of returned photons (Y axis) can be interpreted by a system controller as surfaces and distances that that can be translated into at least object size and shape.

It is contemplated that a system controller can interpret some, or all, of the collected photon information from line 122 to determine information about an object. For instance, the peaks 124 of photon intensity can be identified and used alone as part of a discrete object detection and ranging protocol. A controller, in other embodiments, can utilize the entirety of photon information from line 122 as part of a full waveform object detection and ranging protocol. Regardless of how collected photon information is processed by a controller, the information can serve to locate and identify objects and surfaces in space in front of the light energy source.

Figure 3A:
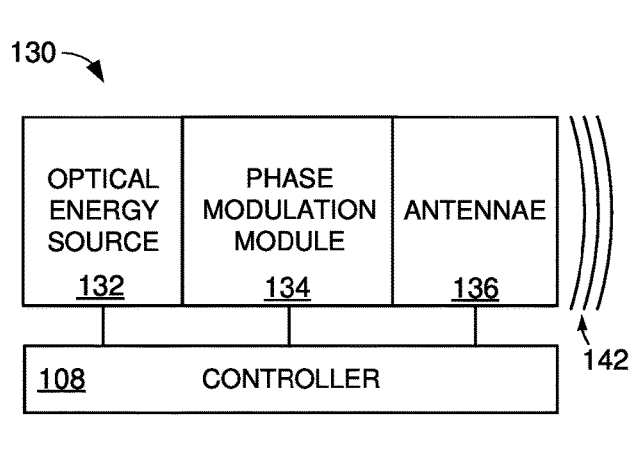
FIGS. 3A & 3B respectively depict portions of an example detection system arranged and operated in accordance with various embodiments.
Figure 3B:
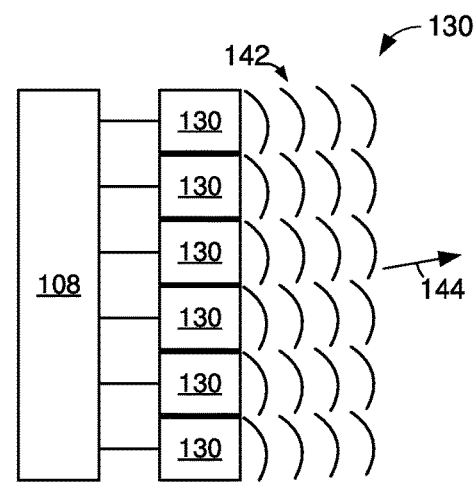

FIGS. 3A & 3B respectively depict portions of an example light detection assembly 130 that can be utilized in a light detection and ranging system 140 in accordance with various embodiments. In the block representation of FIG. 3A, the light detection assembly 130 consists of an optical energy source 132 coupled to a phase modulation module 134 and an antennae 136 to form a solid-state light emitter and receiver. Operation of the phase modulation module 134 can direct beams of optical energy in selected directions relative to the antennae 136, which allows the single assembly 130 to stream one or more light energy beams in different directions over time.

FIG. 3B conveys an example optical phase array (OPA) system 140 that employs multiple light detection assemblies 130 to concurrently emit separate optical energy beams 142 to collect information about any downrange targets 104. It is contemplated that the entire system 140 is physically present on a single system on chip (SOC), such as a silicon substrate. The collective assemblies 130 can be connected to one or more controllers 108 that direct operation of the light energy emission and target identification in response to detected return photons. The controller 108, for example, can direct the steering of light energy beams 142 to a particular direction 144, such as a direction that is non-normal to the antennae 138, like 45°.

The use of the solid-state OPA system 140 can provide a relatively small physical form factor and fast operation, but can be plagued by interference and complex processing that jeopardizes accurate target 104 detection. For instance, return photons from different beams 142 may cancel, or alter, one another and result in an inaccurate target detection. Another non-limiting issue with the OPA system 140 stems from the speed at which different beam 142 directions can be executed, which can restrict the practical field of view of an assembly 130 and system 140.

Figure 4:
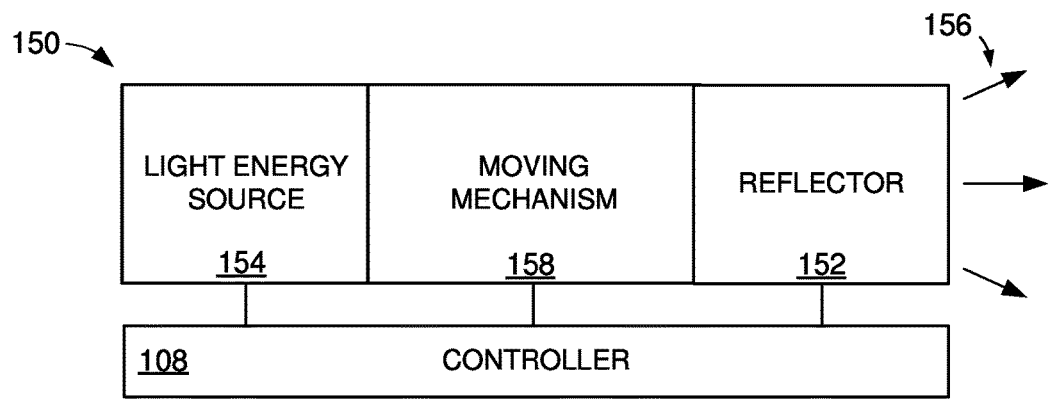
FIG. 4 depicts portions of an example detection system constructed and employed in accordance with some embodiments.

FIG. 4 depicts a block representation of a mechanical light detection and ranging system 150 that can be utilized in assorted embodiments. In contrast to the solid-state OPA system 140 in which all components are physically stationary, the mechanical system 150 employs a moving reflector 152 that distributes light energy from a source 154 downrange towards one or more targets 104. While not limiting or required, the reflector 152 can be a single plane mirror, prism, lens, or polygon with reflecting surfaces. Controlled movement of the reflector 152 and light energy source 154, as directed by the controller 108, can produce a continuous, or sporadic, emission of light beams 156 downrange.

Although the mechanical system 150 can provide relatively fast distribution of light beams 156 in different directions, the mechanism to physically move the reflector 152 can be relatively bulky and larger than the solid-state OPA system 140. The physical reflection of light energy off the reflector 152 also requires a clean environment to operate properly, which restricts the range of conditions and uses for the mechanical system 150. The mechanical system 150 further requires precise operation of the reflector 152 moving mechanism 158, which may be a motor, solenoid, or articulating material, like piezoelectric laminations.

Figure 5:
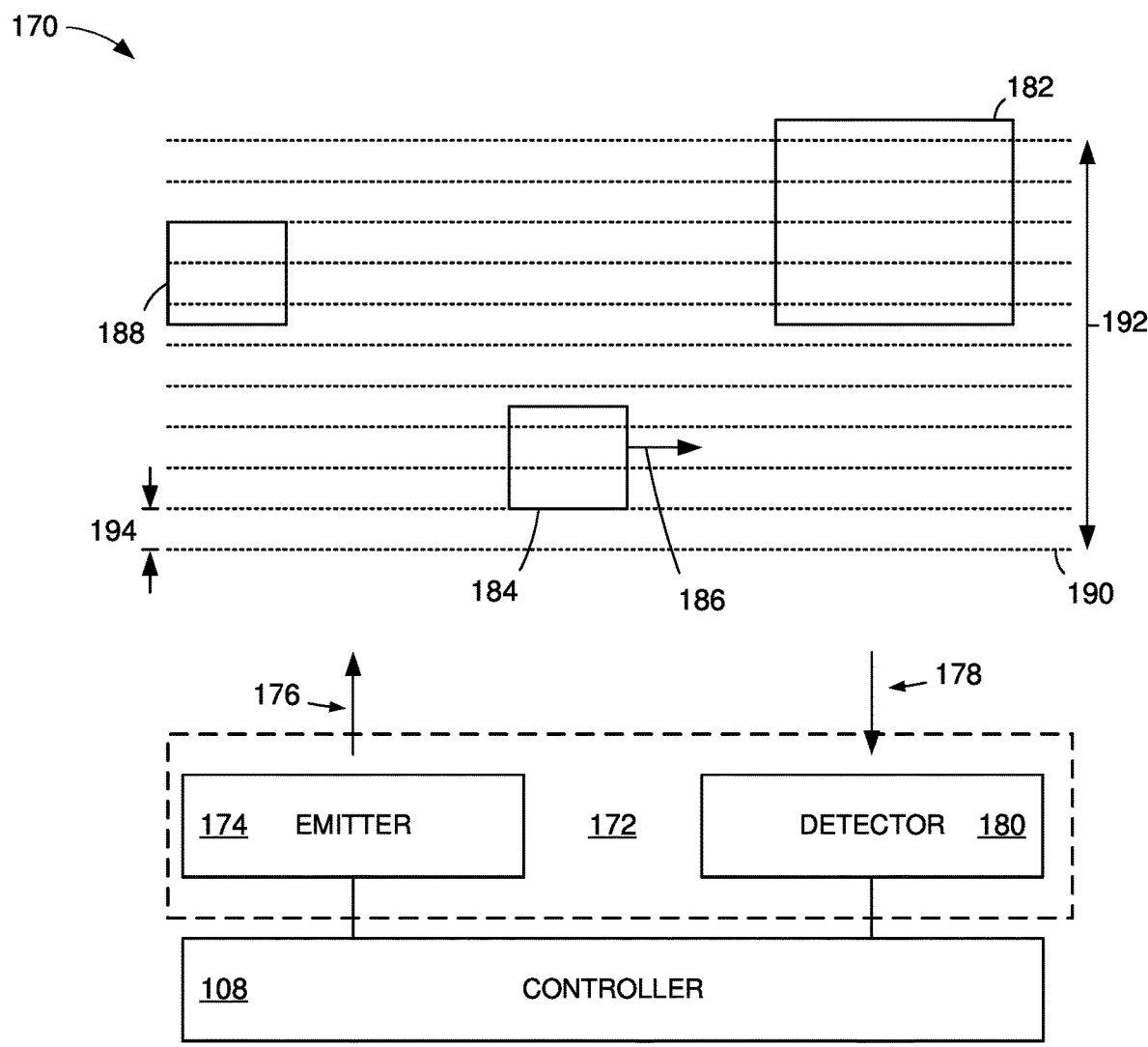
FIG. 5 depicts a block representation of portions of an example detection system employed in accordance with assorted embodiments.

FIG. 5 depicts a block representation of an example detection system 170 that is configured and operated in accordance with various embodiments. A light detection and ranging assembly 172 can be intelligently utilized by a controller 108 to detect at least the presence of known and unknown targets downrange. As shown, the assembly 172 employs one or more emitters 174 of light energy in the form of outward beams 176 that bounce off downrange targets and surfaces to create return photons 178 that are sensed by one or more assembly detectors 180. It is noted that the assembly 172 can be physically configured as either a solid-state OPA or mechanical system to generate light energy beams 172 capable of being detected with the return photons 178.

Through the return photons 178, the controller 108 can identify assorted objects positioned downrange from the assembly 172. The non-limiting embodiment of FIG. 5 illustrates how a first target 182 can be identified for size, shape, and stationary arrangement while a second target 184 is identified for size, shape, and moving direction, as conveyed by solid arrow 186. The controller 108 may further identify at least the size and shape of a third target 188 without determining if the target 188 is moving.

While identifying targets 182/184/188 can be carried out through the accumulation of return photon 178 information, such as intensity and time since emission, it is contemplated that the emitter(s) 174 employed in the assembly 172 stream light energy beams 176 in a single plane, which corresponds with a planar identification of reflected target surfaces, as identified by segmented lines 190. By utilizing different emitters 174 oriented to different downrange planes, or by moving a single emitter 174 to different downrange planes, the controller 108 can compile information about a selected range 192 of the assembly's field of view. That is, the controller 108 can translate a number of different planar return photons 178 into an image of what targets, objects, and reflecting surfaces are downrange, within the selected field of view 192, by accumulating and correlating return photon 178 information.

The light detection and ranging assembly 172 may be configured to emit light beams 176 in any orientation, such as in polygon regions, circular regions, or random vectors, but various embodiments utilize either vertically or horizontally single planes of beam 176 dispersion to identify downrange targets 182/184/188. The collection and processing of return photons 178 into an identification of downrange targets can take time, particularly the more planes 190 of return photons 178 are utilized. To save time associated with moving emitters 174, detecting large volumes of return photons 178, and processing photons 178 into downrange targets 182/184/188, the controller 108 can select a planar resolution 194, characterized as the separation between adjacent planes 190 of light beams 176.

In other words, the controller 108 can execute a particular downrange resolution 194 for separate emitted beam 176 patterns to balance the time associated with collecting return photons 178 and the density of information about a downrange target 182/184/188. As a comparison, tighter resolution 194 provides more target information, which can aid in the identification of at least the size, shape, and movement of a target, but bigger resolution 194 (larger distance between planes) can be conducted more quickly. Hence, assorted embodiments are directed to selecting an optimal light beam 176 emission resolution to balance between accuracy and latency of downrange target detection.

Figure 6:
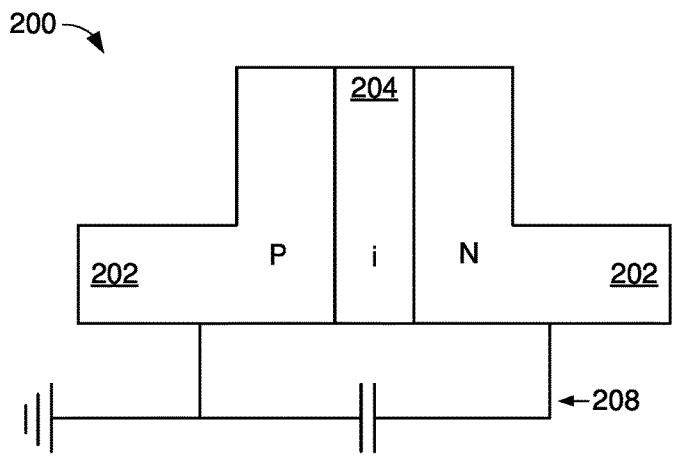
FIG. 6 depicts an example junction that can be utilized in some embodiments to provide optimize beam steering.

FIG. 6 depicts an example junction 200 that can be employed in various embodiments to conduct beam steering. The junction 200 has a pair of doped regions 202 separated by an insulator region 204 to provide a PiN type component. Such configuration is not required or limiting as other semiconductor junction arrangements can be utilized to produce an electrostatic force proximal the junction 200 upon activation of electrical circuitry 206.

Figure 7:
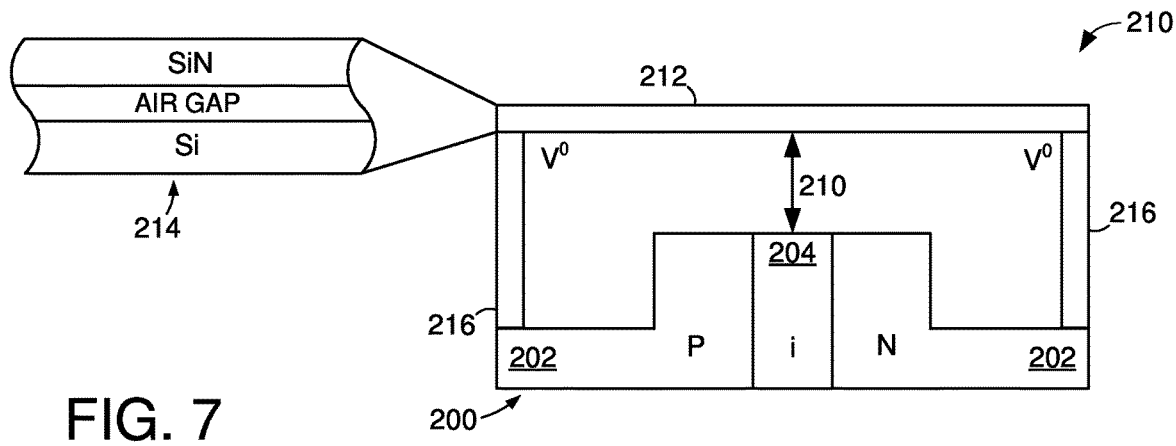
FIG. 7 depicts a line representation of portions of an example detection system that may be utilized with in assorted embodiments.

Incorporation of a semiconductor junction 200 into a light resonator 210, as generally depicted in FIG. 7, can selectively utilize applied voltage to manipulate a metasurface 212 and effectively steer light energy in desired vectors relative to the junction 200. As shown, a metasurface 212 is suspended above the junction 202 by an air gap 214 that can be tuned for size and shape to allow the metasurface 212 to fully react to electrostatic forces produced by the junction 200.

The construction of the metasurface 212 is not limited, but some embodiments continuously extend the metasurface 212 to a length that is greater than the length of the junction 200, as illustrated, and less than 1550 nm. The metasurface 212 may be arranged as a unitary layer of material, such as any semiconductor material, or as a lamination 214 of multiple layers of material. For instance, a metasurface 212 can consist of a SiN layer separated from a Si layer by a continuous air gap, such as 100 nm or less. The suspension of the metasurface 212 above the junction 200 can have a default shape in response to a neutral, or default, voltage applied to electrodes 216 on opposite sides of the junction 200, as shown in FIG. 7.

Figure 8:
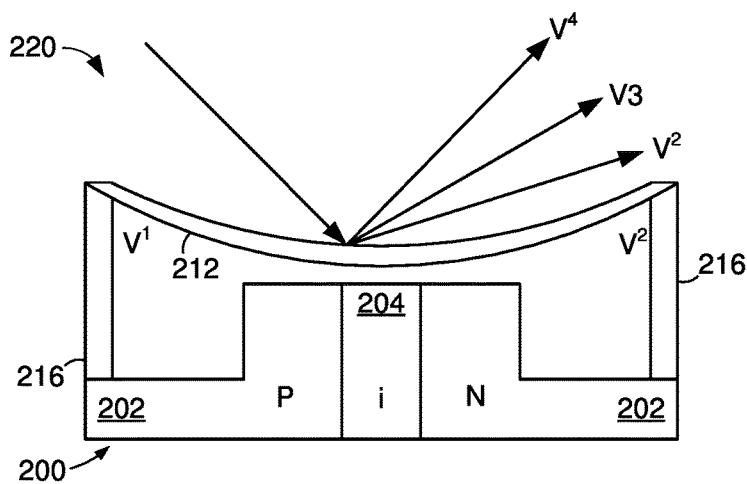
FIG. 8 depicts portions of an example light detection and ranging system configured and operated in accordance with various embodiments.

FIG. 8 depicts portions of an example light detection and ranging system 200 arranged to steer beams of light energy by applying a bias voltage across the electrodes 216 of the resonator 220. The introduction of bias voltage can produce electrostatic energy that physically alters the metasurface 212 to a shape conducive to reflecting light energy in different vector directions relative to the junction 200. As illustrated, different applied voltages can produce different light beam vector directions corresponding with different metasurface 212 surface shapes. When incorporated into a light detection and ranging system the resonator 210/220 can provide fast, efficient, and reliable steering of light beams, which can optimize the range and accuracy of the system compared to other static or dynamic light reflectors.

A foundry compatible metasurface 212, in various embodiments, has a silicon resonator on a SOI wafer. A 220 nm thick silicon nitride film, for instance, can be suspended on top of silicon with 100 nm air in between. Some embodiments configure a silicon resonator as a doped P-i-N arrangement. As voltage is applied across the P-I-N junction, an electrostatic force is created between silicon and silicon nitride. This electrostatic force changes the gap between the silicon disk and silicon nitride membrane and thus changes the effective index of the mode. Change in effective index can be approximately $10^{-2}$, which requires moderate amount of Q. Full $2\pi$ phase tuning with low power will provide a two dimensional metasurface 212 with approximately 60 degrees×60 degrees beam steering.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising an optical source coupled to a resonator, the resonator suspending a metasurface above an electrical junction, the metasurface arranged to steer light beams to a selected vector in response to a predetermined applied voltage.

2. The apparatus of claim 1, wherein the metasurface continuously extends to a length that is greater than a length of the electrical junction.

3. The apparatus of claim 2, wherein the length of the metasurface is 1550 nm or less.

4. The apparatus of claim 1, wherein the electrical junction has a P-i-N configuration.

5. The apparatus of claim 1, wherein the metasurface comprises a single layer of material.

6. The apparatus of claim 5, wherein the single layer of material is Si.

7. The apparatus of claim 1, wherein the metasurface comprises a lamination of layers.

8. The apparatus of claim 7, wherein the lamination of layers consists of an air gap separating a first semiconductor layer and a second semiconductor layer.

9. The apparatus of claim 8, wherein the air gap is uniformly 100 nm.

10. The apparatus of claim 8, wherein the first semiconductor layer is Si.

11. The apparatus of claim 8, wherein the second semiconductor layer is SiN.

12. A method comprising:
coupling an optical source to a resonator, the resonator suspending a metasurface above an electrical junction;
activating the optical source, with a controller connected to the optical source, to generate a light beam oriented at a first angle relative to the metasurface;
applying a first voltage across electrodes of the resonator to alter the metasurface to a first shape; and
steering the light beam to a second angle relative to the metasurface while the metasurface maintains the first shape.

13. The method of claim 12, wherein the metasurface is bent towards the electrical junction to form the first shape in response to the application of the first voltage.

14. The method of claim 12, wherein the metasurface has a horizontal orientation in response to no voltage being applied to the electrodes.

15. The method of claim 12, wherein the light beam travels along the second angle towards a downrange target.

16. The method of claim 15, wherein a position of the downrange target is sensed by the controller in response to reflected portions of the light beam.

17. The method of claim 16, wherein the controller alters the applied voltage to change the metasurface to a second shape in response to sensed downrange target.

18. A method comprising:
coupling an optical source to a first resonator and a second resonator, each resonator suspending a metasurface above an electrical junction;
activating the optical source, with a controller connected to the optical source, to generate a light beam oriented at a first angle relative to the metasurface of each resonator;
applying a first voltage across electrodes of the first resonator to alter the metasurface of the first resonator to a first shape;
steering the light beam to a second angle relative to the metasurface of the first resonator while the metasurface of the first resonator maintains the first shape; and
steering the light beam to a third angle relative to the metasurface of the second resonator in response to application of a second voltage across electrodes of the second resonator, the metasurface of the second resonator maintaining a second shape.

19. The method of claim 18, wherein the controller selects the first voltage and second voltage operate in concert to intersect the second angle and third angle at a downrange target.

* * * * *